March 29, 1960     D. RUFFINO     2,930,478
CONVEYOR BELT
Filed July 23, 1958
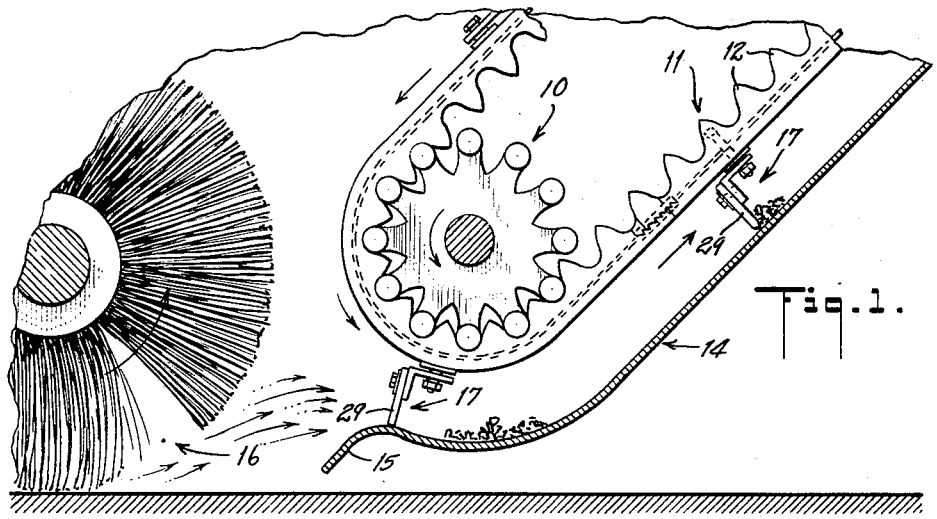
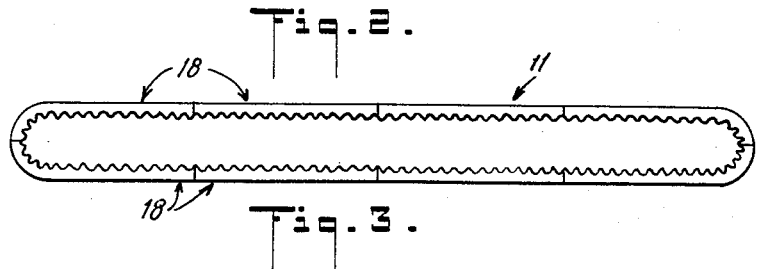
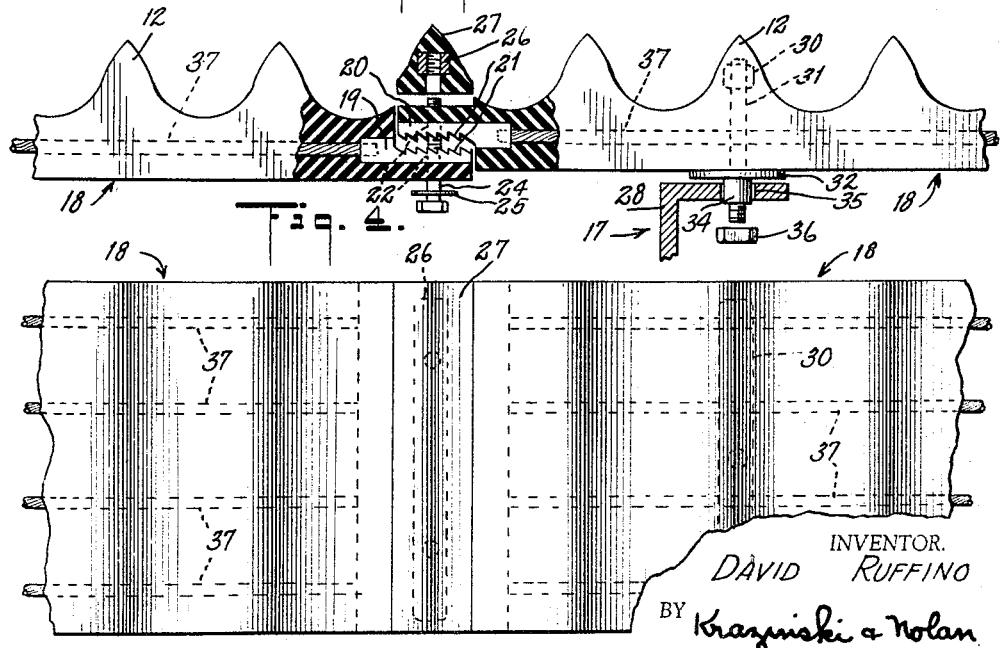
INVENTOR.
DAVID RUFFINO
BY Krazinski & Nolan
ATTORNEYS United States Patent Office 2,930,478
Patented Mar. 29, 1960

2,930,478

CONVEYOR BELT

David Ruffino, Flushing, N.Y.

Application July 23, 1958, Serial No. 750,454

4 Claims. (Cl. 198—175)

The present invention relates to belts for conveyors and, more particularly, to belts which are subjected to extremely rough usage resulting in damage and requiring repair thereof.

The present invention is concerned with belts formed of a rubber composition to reduce noise when operating, particularly where such belts are provided with teeth which mesh with sprockets for driving the belt. An example of such belts may be found in street sweeping apparatus generally comprising a pair of drive sprockets, a pair of one piece belts having teeth on its inner surface, a chute adjacently beneath one strand of the belt, a rotary brush for sweeping dirt from the street into the lower end of the chute, and flights having their ends mounted on the outer surface of the belts for conveying the dirt swept into the chute upwardly to a storage receptacle.

Such belts are operated at fairly high speeds almost constantly for many hours and in time are damaged to the extent that they require repair which necessitates returning them to the factory or garage. This means that the apparatus remains idle until the repaired belt is returned. These belts are relatively costly, whereby it is not economically feasible to have spares on hand in the event of breakdown. Also, the removal of the belt and its replacement involves a considerable expense.

Accordingly, an object of the present invention is to provide a belt of the foregoing character which can be repaired without removing it from the apparatus and sending it to the factory, whereby the apparatus does not remain idle for any length of time.

Another object is to provide such a belt which can be repaired in a rapid and economical manner.

A further object is to provide such a belt having conveying members therein which are arranged to give the belt a longer useful life and to minimize damage thereto.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the application, wherein:

Fig. 1 is a fragmentary side view of a street sweeper, partly in elevation and partly in section, wherein a belt in accordance with the present invention is utilized.

Fig. 2 is a schematic side view of the belt illustrating the same as being constructed of a plurality of belt sections.

Fig. 3 is a fragmentary enlarged view partly in elevation and partly in section illustrating the details of the belt sections.

Fig. 4 is a fragmentary plan view of the belt structure shown in Fig. 3.

Referring now to Fig. 1 of the drawing in detail, there is shown by way of example a portion of a street sweeper of a type now used by many municipalities. As previously indicated, this sweeper comprises pairs of drive sprockets of which only one of the lower sprockets 10 is shown, a pair of belts 11 (only one shown) having teeth 12 on its inner surface, a chute 14 adjacently beneath the lower strand of the belt having a dirt receiving lip 15 at its lower end, an rotary brush 16 for sweeping the dirt from the street into the cnute, and flights 17 mounted on the outer surfaces of the belts for conveying the dirt to a storage receptacle (not shown).

As shown in Fig. 2, each belt 11 is constructed of a plurality of sections 18, for example eight, which sections are therefore much shorter than if the belt were in one piece. Consequently, the belt sections are much less costly than a complete belt, and it is economically feasible to keep on hand a supply of spares for servicing a fleet of sweepers. Also, in the event a belt section is damaged, the damaged section can be readily replaced by a spare section in very little time. Since only a small portion of the overall belt need be replaced, the costs are greatly reduced.

In accordance with the present invention the foregoing objects and advantages are accomplished by the belt structure shown in Figs. 3 and 4. In these views the respective ends of two adjacent belt sections 18 are shown, it being understood that all the belt sections are identical and that the other end (not shown) of the belt section at the left is like the end of the belt section shown at the right and the other end (not shown) of the belt section at the right is like the end of the belt section shown at the left.

The belt sections are constructed of a rubber composition or rubberized fabric to render them flexible and noiseless in operation. In order to removably secure the adjacent ends of the belt sections, each belt section is provided with an upwardly facing gripping plate 19 at one end and a downwardly facing gripping plate 20 at the other end, the plates 19 and 20 being formed with teeth 21 adapted to cooperate to lock the adjacent belt sections against lengthwise movement with respect to each other. It will be understood that other forms of gripping means can be utilized, such as swivels or flexible joints having cooperating elements for so connecting adjacent belt sections.

The plates 19 and 20 are secured to each other to lock the same against crosswise movement with respect to each other, for example, by forming the plates 19 and 20 with registering apertures 22, inserting a bolt element 24 carrying a locking washer 25 into the apertures, and threading a nut element 26 to the bolt element.

In order to facilitate securing the adjacent belt sections, the tooth 12 which would normally be located above the plate 20 is omitted and in its place a tooth member 27 is provided which has the nut elements 26 embedded therein. The tooth member 27 is mounted and arranged to cooperate with the teeth 12 to provide a continuous row of uniformly spaced teeth on the belt.

As shown in Figs. 1 and 3, each flight 17 comprises a right angle 28 having one side attached to the outer surface of both belts 11 and a plate 29 attached to the other side of the angle. Each plate 29 is arranged to pass along the chute with its free end in close proximity to the upper surface of the chute 14. Thus, in the event twigs, small stones or other similar particles are swept into the chute they may jam between the plate 29 and the chute 14 and thus put a considerable sudden load on the belt.

The foregoing is prevented by mounting the angles 28 for swiveling movement, so that the plate can rock back and clear the obstruction and ease the tendency to jam suddenly. This is accomplished by structure comprising a nut element 30 embedded in the belt sections at a tooth 12, a stud or bolt element 31 having screw threads at its ends and having one end threaded into the nut element 30, a flange 32 on the stud abutting the outer surface of the belt section, a collar 34 on the stud between the flange 32 and the free end of the stud 31 which collar extends through an aperture 35 in the angle, and a nut 36 secured to the stud and engaging the collar.

Since the length of the collar is slightly greater than the thickness of the angle at the aperture 35 and there is slight clearance between the collar and the aperture, the flight can rise and tilt slightly in a crosswise and lengthwise direction with respect to the belt. This construction also enables the flight to adjust itself with respect to the chute in the event the angles are positioned unevenly in height.

The belt described herein, by being sectionalized, lends itself to further reinforcement by flexible steel cables 37 adapted to be embedded in the belt sections with their ends secured to the plates 19 and 20, respectively.

From the foregoing description, it will be seen that the present invention provides an improved belt for conveyors or the like which is simple and practical in construction, is economical to manufacture, service and repair, and can readily withstand such rough usage to which it may be subjected.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. A belt of the class described comprising a plurality of lengthwise extending belt sections each having an upwardly facing, toothed gripping plate at one end and a downwardly facing, toothed gripping plate at the other end adapted to cooperate respectively with the downwardly and upwardly facing plates of adjacent belt sections, said plates and belt ends having registerable aperture means therein, a removable member on the surface of each belt section, and readily removable securing means anchored in each of said members and extending through said aperture means including a nut and a bolt element.

2. A belt according to claim 1, wherein said belt sections have sprocket engaging teeth thereon between said plates, and said removable member is a tooth and is mounted on a plate and is arranged to provide uniformly spaced teeth on the belt.

3. A belt according to claim 2, wherein said nut element is embedded in said tooth member.

4. A conveyor belt comprising belt sections, a nut element embedded in each belt section at about the midpoint between the sides thereof, a bolt element having screw threads at each end thereof and having one end threadedly secured to said nut element, said bolt elements having a flange abutting the surface of said belt sections and having a collar between said flange and the screw threads at the free end, conveyor members having an aperture through which a collar extends, and a nut threadedly secured to the free end of each bolt element and abutting a collar, the thickness dimension of said conveyor members at said apertures being less than the depth of said collars to thereby mount said conveyor members for swivelling movement on said belt sections.

References Cited in the file of this patent

UNITED STATES PATENTS

| | | |
|---|---|---|
| 1,527,146 | Litchfield et al. | Feb. 17, 1925 |
| 1,627,354 | Thorsten | May 3, 1927 |
| 2,488,872 | Mathieu | Nov. 22, 1949 |
| 2,743,829 | Ballard | May 1, 1956 |
| 2,803,504 | Lynch | Aug. 20, 1957 |